C. F. MASSEY.
METHOD OF MOLDING BATTERY WELLS.
APPLICATION FILED SEPT. 27, 1909.
1,013,416.
Patented Jan. 2, 1912.
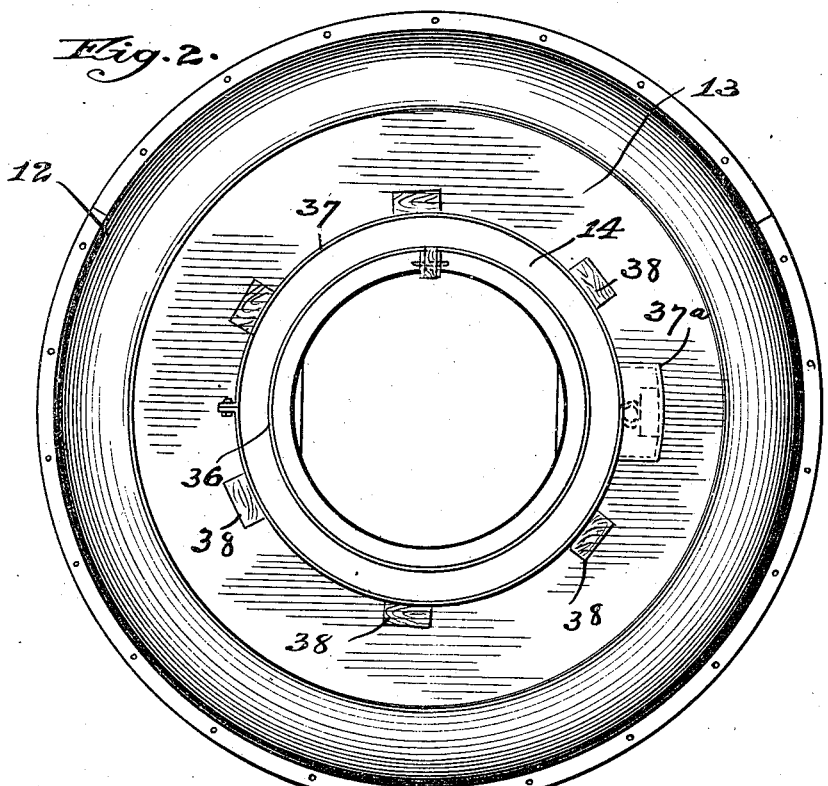
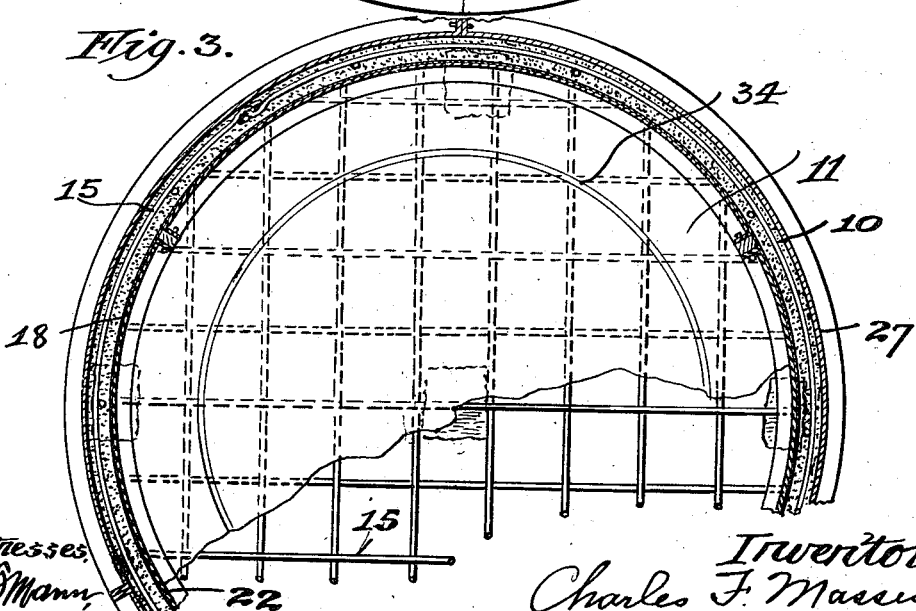

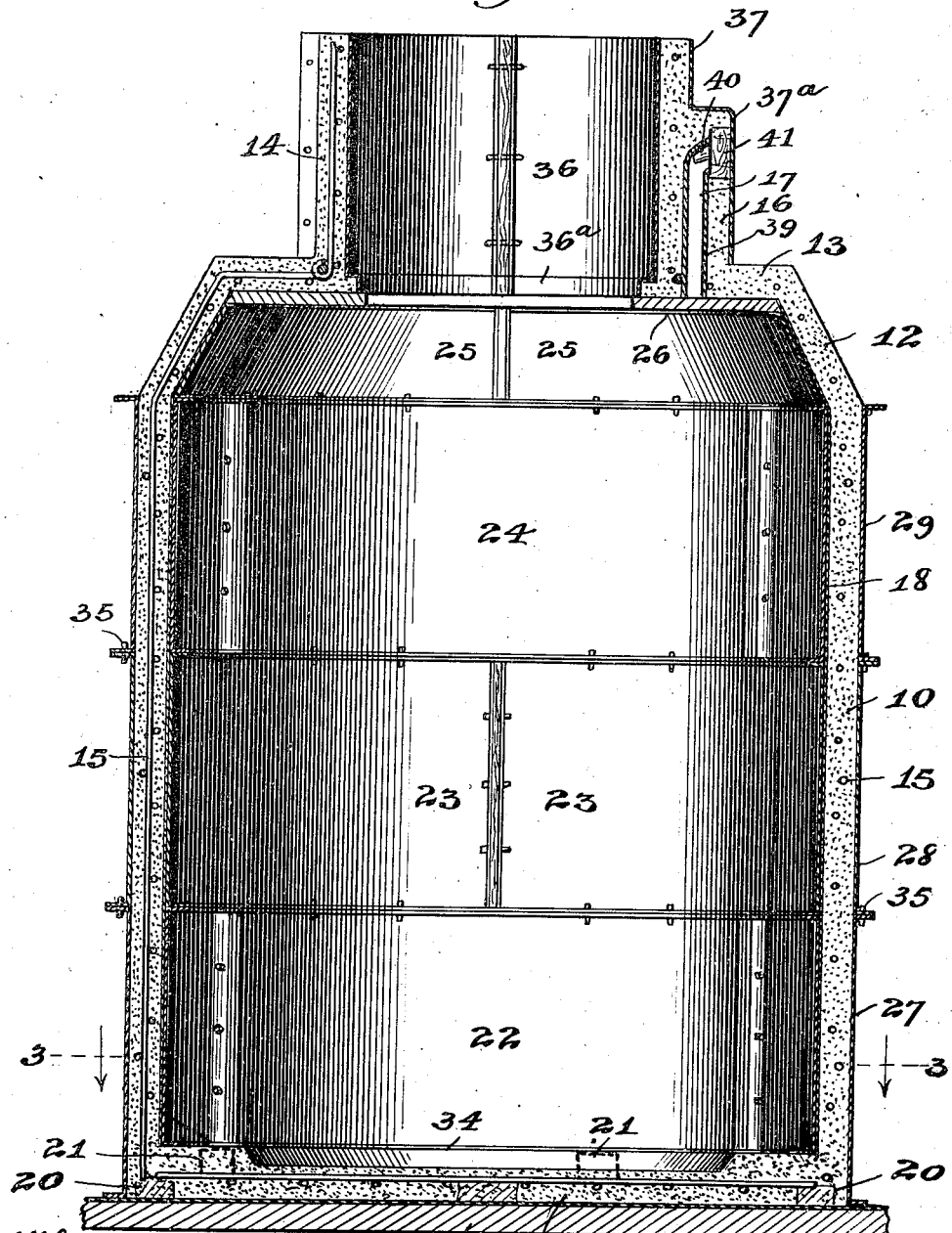

C. F. MASSEY.
METHOD OF MOLDING BATTERY WELLS.
APPLICATION FILED SEPT. 27, 1909.
1,013,416.
Patented Jan. 2, 1912.
3 SHEETS—SHEET 3.
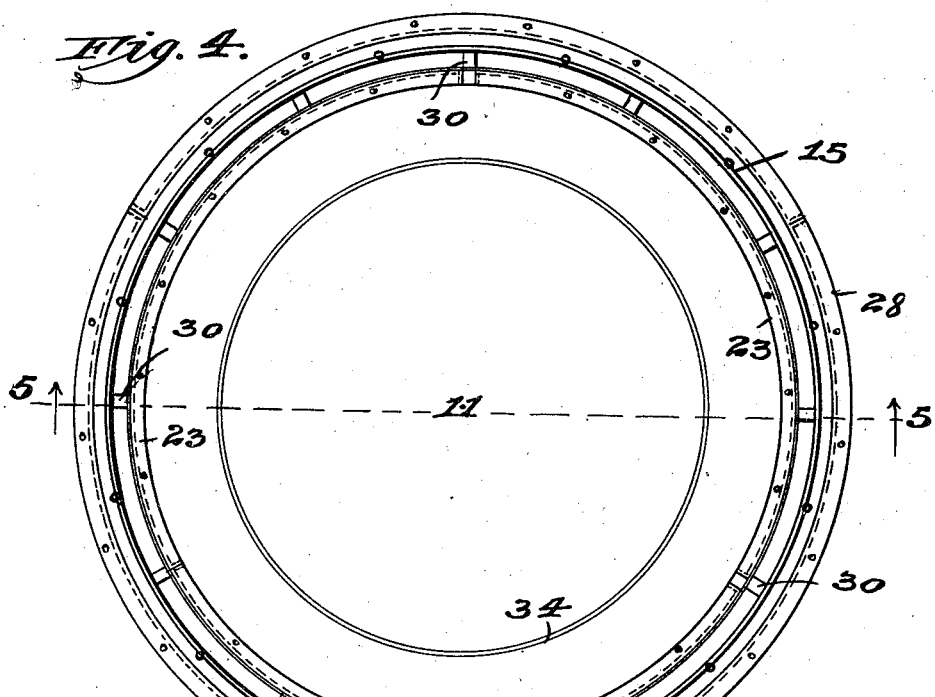
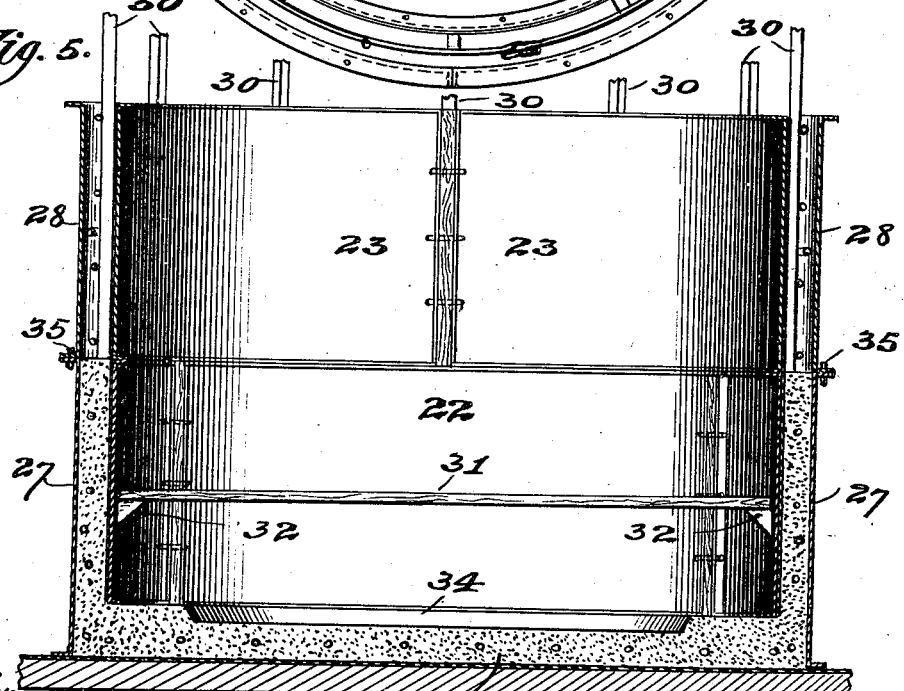

UNITED STATES PATENT OFFICE.

CHARLES FRANCIS MASSEY, OF CHICAGO, ILLINOIS.

METHOD OF MOLDING BATTERY-WELLS.

1,013,416.          Specification of Letters Patent.          Patented Jan. 2, 1912.

Application filed September 27, 1909. Serial No. 519,738.

*To all whom it may concern:*

Be it known that I, CHARLES F. MASSEY, a citizen of the United States, residing at Chicago, in the county of Cook and State of Illinois, have invented certain new and useful Improvements in Methods of Molding Battery-Wells, of which the following is a specification.

This invention relates to a new and improved method of constructing containing vessels, more particularly vessels of a molded monolithic structure such as are now extensively used as battery wells for containing battery cells for operating switch-signaling devices. The particular purpose to which the vessel is applied is, however, immaterial, since a vessel constructed in accordance with my improved method of manufacture may obviously be used for any desired or appropriate purpose.

The vessel or well to which my invention relates is of a generally bottle shape, and its containing walls are constructed of reinforced cement or concrete. That is to say, embedded within the cement or concrete walls is a metallic reinforcement in the form of a wire cage having the general form of the vessel, and serving to strengthen and reinforce the concrete or cement walls against disruptive strains. Vessels of this character have heretofore been molded to form around a collapsible mold that determines the form and dimensions of the main or body portion and upper or neck portion of the vessel; and the incorporation of the wire fabric reinforcement in and throughout the containing walls of the vessel in an efficient and practical manner has heretofore proved a problem of some difficulty to builders of these devices. According to one method heretofore practiced in forming the bottom wall of the vessel, the wire fabric reinforcement has been pressed downwardly into a layer of plaster or cement deposited upon a suitable horizontal table or platform and of proper size to form the bottom wall of the vessel. My present improvement is chiefly distinguished from such a method of forming the base or bottom wall of the structure in that the cement or other plastic material is molded or cast around the wire fabric forming the bottom wall of the metal reinforcement from the inside of the hollow mold, the wire fabric being so supported that it will occupy its proper relative position in the completed wall. In other words, instead of introducing the reinforcement by pressure into the cement wall while still plastic, I fix the reinforcement in proper position and then mold or cast the cement wall thereupon.

Other minor novel improvements in the operation of building up containing vessels of this character will appear from the following description, taken in connection with the accompanying drawings which are intended to illustrate both the structure and the method of molding a monolithic battery well of the type to which my invention chiefly relates.

Referring to the drawings—Figure 1 is a vertical central section through the containing vessel constructed in accordance with my improved method, also showing in section an internal collapsible core and a sectional external mold used in its construction. Fig. 2 is a top plan view of Fig. 1. Fig. 3 is a broken horizontal section on the line 3—3 of Fig. 1, showing the cement bottom of the vessel broken away to more clearly show the metallic reinforcement. Fig. 4 is a top plan view showing sections of the inner and outer molds with the wire reinforcement therebetween, and the manner and means of separating and spacing the latter from the inner mold or core member. Fig. 5 is a central vertical section on the line 5—5 of Fig. 4.

Referring to the drawings, I will first briefly set forth the chief structural features of the vessel, and will then describe in detail the manner of constructing or erecting the same.

10 designates the main cylindrical body of the vessel, 11 its bottom wall, 12 an inwardly flared or tapered upper extension of the body 10, 13 a horizontal annular wall extending inwardly of the upper end of the section 12 and forming with the latter an annular shoulder, and 14 a cylindrical neck portion surmounting the shoulder portion 13. The several walls mentioned are all formed of cement, plaster, concrete, or other similar plastic material molded or cast around and within suitable mold forms hereinafter described to form a water-tight monolithic structure. These walls are reinforced throughout by an internal wire fabric, designated as an entirety by 15, embedded therein. My present improvements are not concerned with the particular structure of this reinforcement, but it may be similar to that disclosed in my former Patent No. 891,944, granted June 30, 1909, or of any other suitable and appropriate structure.

On one side of the neck member 14 is cast an integral lateral projection 16 cored longitudinally from its lower end to near its upper end, with a lateral opening through the side of said extension to form a wire conduit 17; and the inner walls of the main cylindrical body portion 10 and its tapered extension 12 are lined with tarred paper or any similar asphaltum and fiber composition indicated at 18, which prevents dampness or sweating caused by atmospheric conditions, and keeps the interior of the well in a dry condition.

Referring now to my improved method of molding the vessel described, 19 designates a suitable table or platform, on which are set at intervals spacing blocks 20, which latter are preferably of material similar to that of which the vessel is constructed and ultimately become integral parts of the latter. On these blocks is supported the previously constructed wire cage, with the exception of the neck portion thereof, or it may be only the lower portion of said cage, and on the bottom or floor of the cage are placed other spacing blocks 21 preferably offset relatively to the blocks 20, which blocks 21 form a support for the inner mold-member or core, this latter being a collapsible structure built up of a series of cylindrical segments 22, 23 and 24, separably connected at their ends, as shown, and flaring or conical segments 25 similarly connected and defining the tapered or flaring portion 12 of the vessel, with an annular horizontal mold-board 26 superposed on the conical sections 25 to define the horizontal surface 13 of the shoulder portion. Around the inner mold or core is placed a sheathing 18 of waterproof material, such as tarred paper or the like. The outer mold is likewise made in a series of cylindrical sections 27, 28 and 29, and before applying the cement forming the bottom wall of the vessel, the lower cylindrical section of the outer mold is put in position around the lower end of the reinforcement. To properly space the wire fabric reinforcement or cage from the core member I interpose, at intervals between the two, vertical spacing rods 30, as shown in Fig. 6, which extend to the bottom wall of the reinforcement. The cement in a sufficiently plastic condition to be tamped and worked is then introduced through the top of the core and is spread over the area of the table or platform 19 directly underlying the outer and inner molds, being applied roughly to the desired thickness of the bottom wall of the vessel and thoroughly tamped to completely fill the space within the lower end of the outer mold section 27 and up to the lower end of the inner mold section 22. The upper surface of the bottom wall thus formed is finished to the desired form by troweling, for which purpose any suitable provision may be employed for supporting the workmen above the bottom wall thus formed, such as a narrow platform, indicated at 31 in Fig. 5, supported at its ends on brackets 32 secured to the inner sides of the lower core section 22. The cement is thoroughly tamped to produce a solid homogeneous structure free from airholes, and completely embodying the bottom or floor section of the reinforcement. This floor wall 11 is preferably formed on its upper surface with a shallow depression or counter-sink 34. The bottom 11 having been thus formed, cement in a sufficiently liquid state to run easily is then poured in over the top of the outer mold section 27, completely filling the annular space between the lower inner and outer mold sections, as shown in Fig. 5. This having been done, the next higher outer mold section 28 is secured on the lower outer mold section 27, the two sections having mating flanges temporarily united by bolts 35; the rods 30 are raised to allow the cement to flow together and fill the holes formed thereby, and another charge of the liquid cement is then poured in over the top of the outer mold section 28, forming a jointless union with the previously applied cement, and thus building the annular wall to the top of the intermediate section 28. The top section 29 is then applied, the spacing rods 30 raised, and another body of cement poured in, in the manner described, thus building the wall up to the base of the tapered or flared portion 12. The shoulder sections 12 and 13 are formed upon the inner mold members 25 and 26 by simply applying the cement in a sufficiently thickened condition to be plastic without running, these wall sections being shaped externally by troweling. The wire reinforcement of the upper neck or man-hole portion of the vessel, in the form of a relatively narrow cylinder, is then attached in any suitable way at its lower end to the inwardly bent upper end of the wire reinforcement of the body section, the inner mold or core member 36 having an inwardly offset lower end 36ª is set in place, resting upon the ring 26; and the outer mold section 37 having a lateral offset 37ª is then slipped over the wire reinforcement, its lower end being supported on top of the horizontal or shoulder wall section 13 by blocks 38 (Fig. 2) secured thereto at intervals and resting directly on the shoulder section 13. Within the lateral projection 37ª of this outer mold member is secured a mold tube 39 having an outwardly bent upper end suspended on a nub 40 projecting inwardly from a wooden block 41, which latter is secured as by a screw 42 to the inner surface of the offset projection 37ª. Into the upper mold thus formed, cement in a sufficiently liquid form is poured from the upper end, completely filling said mold and forming the contracted neck portion of the vessel, the same being united in an integral or autogeneous manner to the main body section. By removing the screw 42, the outer mold member 37 may be raised, and the block 41 with its nub 40 withdrawn, the pipe 39 being allowed to remain as lining for the wire conduit. The socket formed by the block 41 is designed to receive the end of the trunking, affording a perfectly water-tight connection and preventing the trunking separating from the well and exposing the wires. The several inner mold members are each made in separable sectional form, as shown, so that they can be readily taken apart and removed through the neck of the vessel when the cement has thoroughly hardened and set.

I claim:

1. The process of constructing the bottom and side walls of a vessel of the character described, which consists in supporting a wire cage on and spaced from a suitable surface, surrounding said cage by an external mold-member, supporting an internal bottomless mold-member upon and suitably spaced from the bottom and sides of said wire cage, introducing through said internal mold-member a body of plastic cement and distributing and shaping the same to embed therein the bottom of said cage and form the bottom wall of the vessel, and introducing between the side walls of said inner and outer core members a body of cement in a sufficiently liquid state to distribute itself by gravity throughout the annular space and embed therein the side walls of said cage, substantially as described.

2. The process of constructing the bottom and side walls of a vessel of the character described, which consists in supporting a wire cage on and spaced from a suitable surface, surrounding the bottom of said cage by the lower section of a sectional external mold-member, supporting an internal bottomless mold-member upon and suitably spaced from the bottom and sides of said wire cage, introducing through said internal mold-member a body of plastic cement and distributing and shaping the same to embed therein the bottom of said cage and form the bottom wall of the vessel, introducing between said internal mold-member and said lower section of the external mold-member a body of cement in a sufficiently liquid state to distribute itself therebetween, and building up the balance of the side wall of the vessel by superimposing successive external mold-sections, and successively filling the spaces between each such section and the internal mold-member with liquid cement, substantially as described.

3. The process of constructing the bottom, side, and shouldered walls of a vessel of the character described, which consists in supporting a wire cage having the general contour of said walls on and spaced from a suitable surface, surrounding said cage by an external mold-member, supporting an internal bottomless mold-member having a shouldered upper end upon and suitably spaced from the bottom, sides and shoulder of said wire cage, introducing through said internal mold-member a body of plastic cement and distributing and shaping the same to embed therein the bottom of said cage and form the bottom wall of the vessel, introducing between the side walls of said inner and outer core members a body of cement in a sufficiently liquid state to distribute itself by gravity throughout the annular space and embed therein the side walls of said cage, and applying to and over the shouldered portions of said internal mold-member and wire cage a body of plastic cement and distributing and externally shaping the same to embed therein the shouldered portion of said wire cage and form the shouldered wall of said vessel, substantially as described.

4. The process of constructing a vessel of the form and character described, which consists in supporting a wire cage having the general contour of the bottom, side and upper shouldered walls of the vessel on and spaced from a suitable surface, surrounding said cage by an external mold-member, supporting an internal bottomless mold-member having a shouldered upper end upon and suitably spaced from the bottom, sides and shoulder of said wire cage, introducing through said internal mold-member a body of plastic cement and distributing and shaping the same to embed therein the bottom of said cage and form the bottom wall of the vessel, introducing between the side walls of said inner and outer core members a body of cement in a sufficiently liquid state to distribute itself by gravity throughout the annular space and embed therein the side walls of said cage, applying to and over the shouldered portions of said internal mold-member and wire cage a body of plastic cement and distributing and externally shaping the same to embed therein the shouldered portion of said wire cage and form the shouldered wall of said vessel, attaching to said shouldered portion of the cage a contracted neck portion, suitably positioning inner and outer mold members relatively to said neck portion of the cage, and introducing between the latter a body of cement in a sufficiently liquid state to distribute itself by gravity throughout the annular space and embed therein the neck portion of said cage and form the neck of the vessel, substantially as described.

CHARLES FRANCIS MASSEY.

Witnesses:
SAMUEL N. POND,
EMILIE ROSE.